United States Patent
Schulz

(10) Patent No.: US 7,819,655 B2
(45) Date of Patent: Oct. 26, 2010

(54) LINEARLY DISPLACEABLE ROTARY DRIVE FOR A PLASTIC INJECTION-MOLDING MACHINE

(75) Inventor: Udo Schulz, Bad Neudstadt (DE)

(73) Assignee: Siemens Aktiengesellschaft, Munich (DE)

(*) Notice: Subject to any disclaimer, the term of this patent is extended or adjusted under 35 U.S.C. 154(b) by 150 days.

(21) Appl. No.: 11/719,908

(22) PCT Filed: Nov. 16, 2005

(86) PCT No.: PCT/EP2005/056003

§ 371 (c)(1),
(2), (4) Date: Jul. 27, 2009

(87) PCT Pub. No.: WO2006/056547

PCT Pub. Date: Jun. 1, 2006

(65) Prior Publication Data

US 2009/0297655 A1    Dec. 3, 2009

(30) Foreign Application Priority Data

Nov. 22, 2004    (DE) .................. 10 2004 056 209

(51) Int. Cl.
*B29C 45/50* (2006.01)
(52) U.S. Cl. .................. 425/574; 425/149; 425/587
(58) Field of Classification Search .................. 425/145, 425/149, 557, 564, 587
See application file for complete search history.

(56) References Cited

U.S. PATENT DOCUMENTS

| 3,140,332 | A |   | 7/1964  | Brown |
|-----------|---|---|---------|-------|
| 3,319,298 | A | * | 5/1967  | Kiraly .................. 425/145 |
| 3,666,141 | A | * | 5/1972  | Ma et al. .................. 222/1 |
| 3,797,808 | A | * | 3/1974  | Ma et al. .................. 366/78 |
| 3,888,388 | A | * | 6/1975  | Mahoney .................. 222/1 |
| 3,889,849 | A | * | 6/1975  | Chandler, Jr. .................. 222/63 |
| 4,172,991 | A | * | 10/1979 | Akamatsu et al. .................. 318/722 |
| 4,592,712 | A | * | 6/1986  | Gutjahr .................. 425/145 |
| 4,895,505 | A | * | 1/1990  | Inaba et al. .................. 425/145 |
| 5,018,950 | A | * | 5/1991  | Reinhart .................. 417/383 |
| 5,381,702 | A |   | 1/1995  | Ohno |
| 5,714,176 | A | * | 2/1998  | Wurl et al. .................. 425/145 |
| 5,747,076 | A | * | 5/1998  | Jaroschek et al. .................. 425/145 |
| 6,051,896 | A | * | 4/2000  | Shibuya et al. .................. 310/12.14 |
| 6,341,953 | B1| * | 1/2002  | Okubo et al. .................. 425/145 |

(Continued)

FOREIGN PATENT DOCUMENTS

DE    21 62 187    6/1973

(Continued)

*Primary Examiner*—Yogendra N Gupta
*Assistant Examiner*—Emmanuel S Luk
(74) *Attorney, Agent, or Firm*—Henry M. Feiereisen; Ursula B. Day

(57) ABSTRACT

The invention relates to a combination drive for a plastic injection-molding machine having a rotary drive (1) for driving a screw shaft (9) so as to rotate and a linear drive (2) for driving the screw shaft (9) so as to perform a linear movement in the axial direction in relation to the rotary drive (1). When the linear drive (2) performs a linear movement, the rotary drive (1) is linearly entrained, thereby avoiding any axial forces on the rotary drive (1).

1 Claim, 2 Drawing Sheets

U.S. PATENT DOCUMENTS

| | | | |
|---|---|---|---|
| 7,033,158 B2 * | 4/2006 | Becker et al. | 425/150 |
| 7,316,553 B2 * | 1/2008 | Teng et al. | 425/145 |
| 7,399,179 B2 * | 7/2008 | Schultz et al. | 425/574 |
| 7,588,434 B2 * | 9/2009 | Schultz et al. | 425/145 |
| 2005/0048162 A1 * | 3/2005 | Teng et al. | 425/574 |

FOREIGN PATENT DOCUMENTS

| | | |
|---|---|---|
| DE | 43 44 335 A1 | 6/1995 |
| DE | 199 33 934 C2 | 5/2002 |
| DE | 101 35 516 A1 | 6/2002 |
| DE | 103 04 578 B3 | 3/2004 |
| DE | 102 43 248 A1 | 4/2004 |
| DE | 198 52 513 B4 | 6/2004 |
| GB | 1 094 037 | 12/1967 |
| JP | 5063816 U | 8/1993 |

* cited by examiner

LINEARLY DISPLACEABLE ROTARY DRIVE FOR A PLASTIC INJECTION-MOLDING MACHINE

BACKGROUND OF THE INVENTION

The present invention relates to a drive for a plastic injection-molding machine having a rotary drive for driving a worm shaft to perform a rotation and a linear drive for driving the worm shaft to perform a linear movement in the axial direction in relation to the rotary drive, the rotary drive being capable of being displaced linearly by the linear drive. Such a drive is known from DE 198 52 513 B4.

In plastic injection-molding machines with a worm, the worm is moved in rotary fashion for the purpose of plastifying the plastic granules. The injection-molding process is achieved by a linear movement of the worm, which is typically realized by a hydraulic motor.

In this regard, the document DE 43 44 335 A1 has disclosed a corresponding injection-molding assembly for an injection-molding machine. This injection-molding assembly substantially comprises a worm cylinder, a worm and a worm drive comprising two electric motors, one electric motor being provided for the rotary driving and the other electric motor being provided for the axial movement of the worm. In order to achieve a compact design whilst simplifying the force transmission devices in the worm drive, the invention proposes arranging the two electric motors with their axes aligned with the axis of the worm, at least one electric motor being in the form of a hollow-shaft motor.

DE 101 35 516 A1 has disclosed a drive apparatus for the injection-molding unit of a plastic injection-molding machine which comprises an electromotive drive unit, which has a linearly movable output element and an electric motor, and a plurality of piston/cylinder units. The manner in which the piston/cylinder units function is very complex. A rotary drive acts at a point which is coaxially upstream of a first piston/cylinder unit.

SUMMARY OF THE INVENTION

The object of the present invention consists in proposing an alternative, possibly simpler drive for an injection-molding machine.

According to the invention, this is achieved by a drive for a plastic injection-molding machine having the features in accordance with patent claim 1.

According to the invention, the rotary drive and the linear drive are arranged coaxially one behind the other, and the linear drive has a hydraulic cylinder, whose hydraulic piston is rigidly connected to the rotor of the rotary drive. As a result, high linear forces can be transmitted to a worm without them acting on the rotary drive.

Preferably, the rotary drive has an electric motor and in particular a hollow-shaft motor. In particular, so-called torque motors having a very high torque are used for this purpose which make it possible to plastify the plastic granules.

BRIEF DESCRIPTION OF THE DRAWING

The present invention will now be explained in more detail with reference to the attached drawings, in which.

DETAILED DESCRIPTION OF THE PREFERRED EMBODIMENTS

The exemplary embodiments described in more detail below represent preferred embodiments of the present invention.

Figure 1:
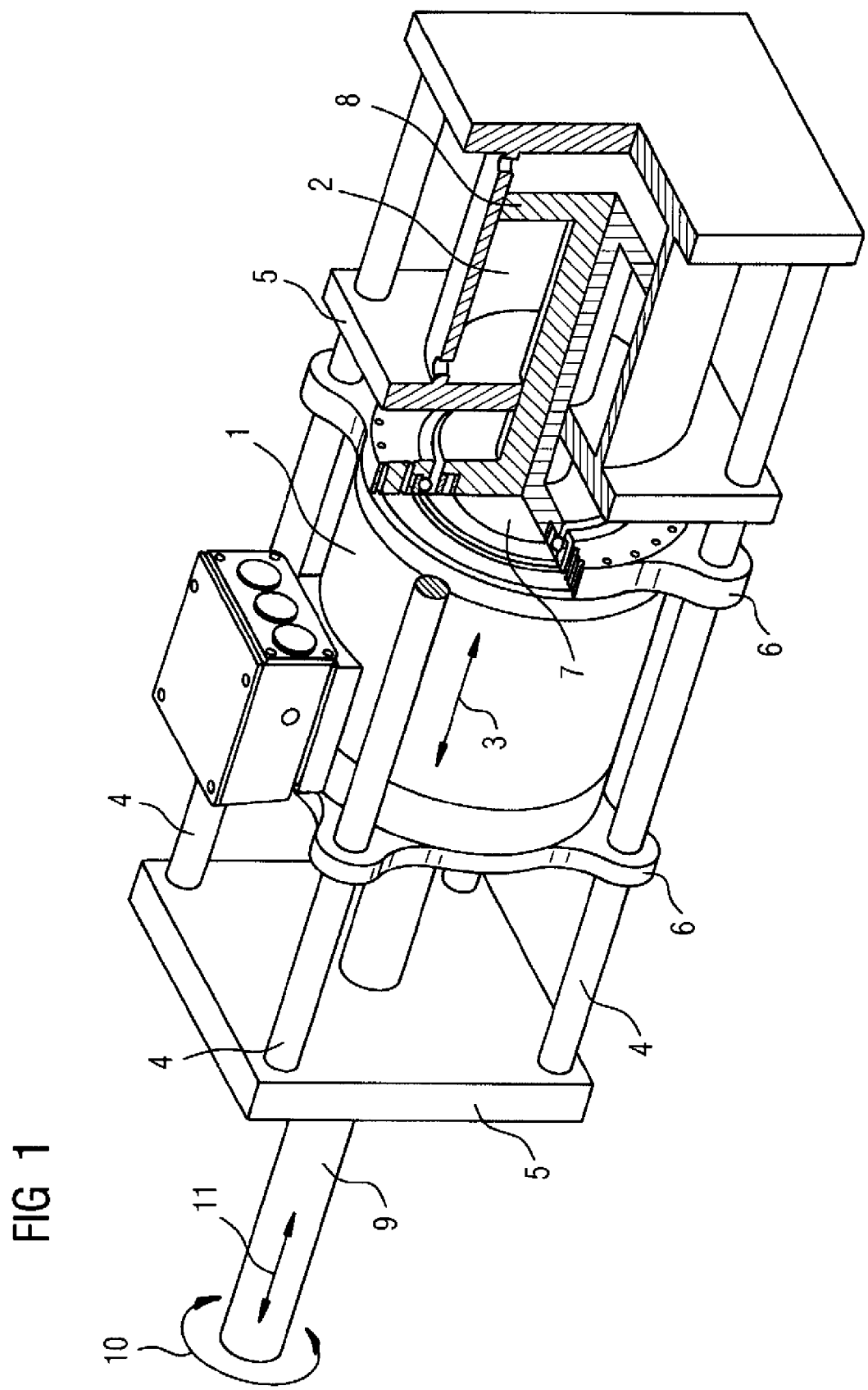
FIG. 1 shows a perspective view of a drive according to the invention in accordance with a first embodiment.

The drive reproduced in FIG. 1 comprises a displaceable electric motor 1, which is in the form of a hollow-shaft motor, having a hydraulic cylinder 2 arranged behind it. The electric motor can be displaced corresponding to the arrow 3 by the hydraulic cylinder 2 in the axial direction of the electric motor.

Guide rods 4, which are fixed in guide plates 5, are used for guiding the electric motor 1 in its linear movement in the axial direction. The housing of the electric motor 1 has guide eyelets 6 on the motor plates, with which guide eyelets the electric motor 1 can slide onto the guide rods 4.

The rotor 7 of the electric motor 1 is rigidly connected to the piston 8 of the hydraulic cylinder 2. The movement of the hydraulic cylinder is therefore transmitted directly to the electric motor 1.

A worm shaft 9 is coupled to the rotor of the electric motor 1. As a result, it can be driven to perform rotary movements 10. Likewise, the linear movements 3 of the electric motor 1 are therefore transferred directly to linear movements 11 of the worm shaft 9.

Figure 2:
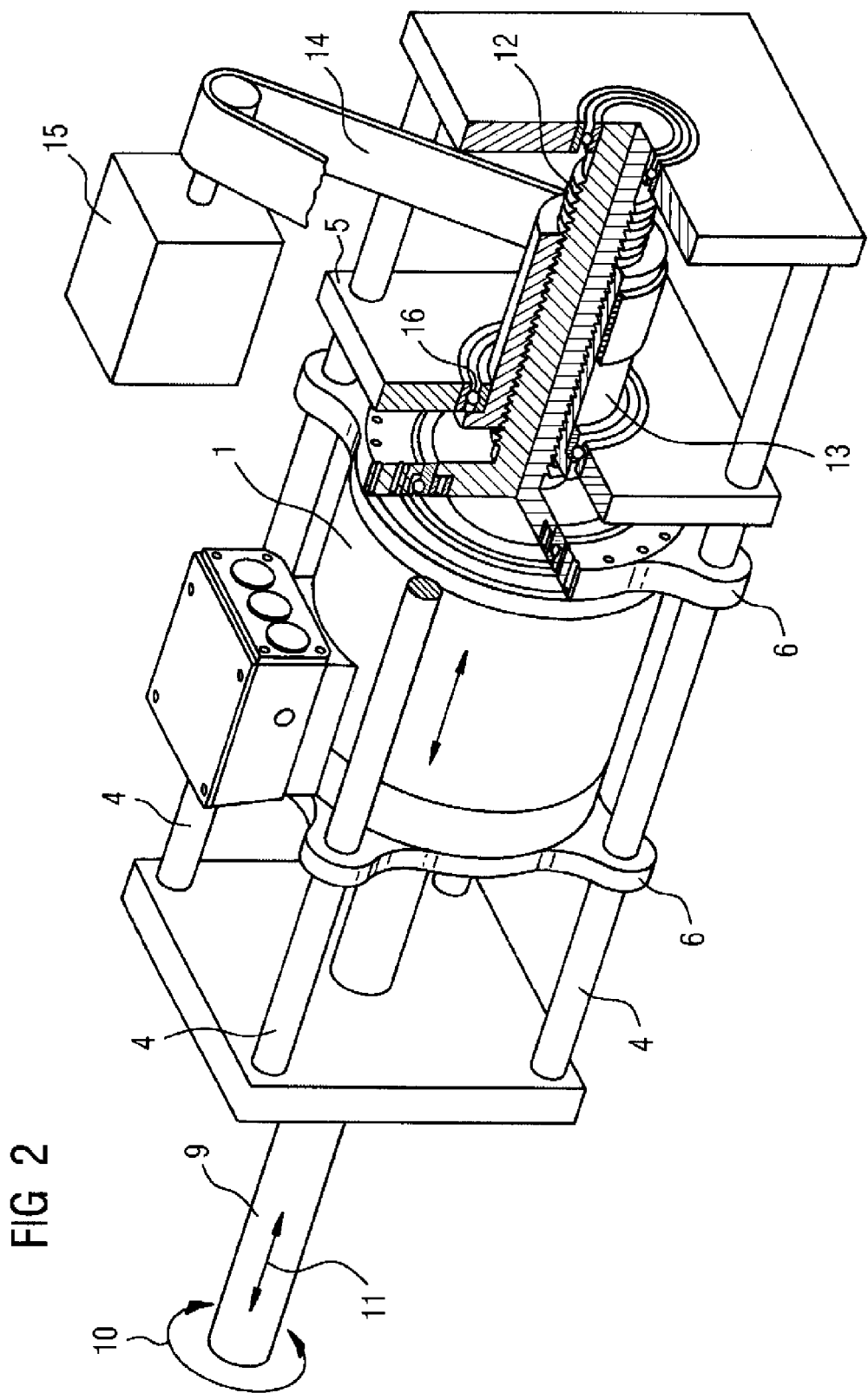
FIG. 2 shows a perspective view of a second embodiment of a drive according to the invention.

A second embodiment of the present invention is reproduced in FIG. 2. In this case, too, the electric motor I is axially displaceable. This also takes place using the guide rods 4, on which eyelets 6 of the motor plates are mounted in sliding fashion.

The linear drive is in this case realized by a roller-type threaded drive including a threaded spindle 12 and a nut 13. The nut 13 is driven with the aid of a belt 14 and an electric motor 15. The nut 13 has a flange-like shape on one end side and is therefore supported on the inner ring of a bearing 16, which is incorporated in one of the guide plates 5. The bearing 16 is therefore designed such that it can also absorb axial forces.

The threaded spindle 12 is in turn rigidly connected to the rotor of the electric motor 1, with the result that the linear movement of the threaded spindle 12 is transmitted to the electric motor 1 and the worm shaft 9. In the event of a rotary movement of the rotary drive 1, the electric motor 15 for the linear drive also rotates in corresponding fashion.

In alternative embodiments, for example, the guide rods 4 can be replaced by corresponding linear drives, for example linear motors or hydraulic cylinders. As a result, installation space can be saved in the axial direction.

What is claimed is:

1. A drive for a plastic injection-molding machine, comprising:
    a rotary drive for rotating a worm shaft, said rotary drive including an electric motor, which has a rotor coupled to the worm shaft, and motor plates respectively placed adjacent opposite end surfaces of the electromotor; and a linear drive for driving the worm shaft to perform a linear movement in an axial direction in relation to the rotary drive, wherein the rotary drive and the linear drive are arranged coaxially behind one another, and wherein the linear drive has a hydraulic cylinder and a hydraulic piston movable within the hydraulic cylinder and rigidly connected to the rotor of the rotary drive, said hydraulic piston being rotatably supported on one of the motor plates in confronting relationship thereto and jointly executing with the motor plates a linear movement of the rotary drive, when the piston moves within the hydraulic cylinder.

* * * * *